US007273281B2

(12) United States Patent
Stern et al.

(10) Patent No.: US 7,273,281 B2
(45) Date of Patent: Sep. 25, 2007

(54) METHOD AND APPARATUS FOR ALIGNING A PLURALITY OF LASERS IN AN ELECTRONIC DISPLAY DEVICE

(75) Inventors: Miklos Stern, Woodmere, NY (US); Paul Dvorkis, East Setauket, NY (US); Narayan Nambudiri, Kings Park, NY (US); Carl Wittenberg, Water Mill, NY (US); Chinh Tan, Setauket, NY (US); Ron Goldman, Cold Spring Harbor, NY (US); Dmitriy Yavid, Stony Brook, NY (US); Frederick F. Wood, Medford, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 455 days.

(21) Appl. No.: 10/836,812

(22) Filed: Apr. 30, 2004

(65) Prior Publication Data

US 2005/0168728 A1    Aug. 4, 2005

(51) Int. Cl.
*G03B 21/00* (2006.01)
*G09G 3/00* (2006.01)
*G01B 11/26* (2006.01)

(52) U.S. Cl. .................. 353/31; 345/30; 345/32; 356/153

(58) Field of Classification Search ......... 359/196–214
See application file for complete search history.

(56) References Cited

U.S. PATENT DOCUMENTS

| 5,029,975 | A |   | 7/1991  | Pease ................... 350/96.27 |
|---|---|---|---|---|
| 5,311,321 | A |   | 5/1994  | Crowley ................. 348/760 |
| 5,467,104 | A | * | 11/1995 | Furness et al. ............. 345/8 |
| 5,614,961 | A |   | 3/1997  | Gibeau et al. ............ 348/750 |
| 5,715,021 | A |   | 2/1998  | Gibeau et al. ............ 348/750 |
| 5,845,981 | A | * | 12/1998 | Bradley .................... 353/31 |
| 5,920,361 | A |   | 7/1999  | Gibeau et al. ............ 348/750 |
| 5,929,979 | A | * | 7/1999  | Okino et al. .............. 355/60 |
| 5,995,246 | A | * | 11/1999 | Komiya et al. ........... 358/481 |
| 6,018,408 | A |   | 1/2000  | Hong ...................... 359/201 |
| 6,140,979 | A |   | 10/2000 | Gerhard et al. ............. 345/7 |
| 6,169,562 | B1 | * | 1/2001  | Morimoto ................. 347/232 |
| 6,175,440 | B1 | * | 1/2001  | Conemac .................. 359/204 |
| 6,304,237 | B1 |   | 10/2001 | Karakawa .................. 345/84 |
| 6,433,907 | B1 | * | 8/2002  | Lippert et al. ............. 359/201 |
| 6,489,934 | B1 |   | 12/2002 | Klausner .................. 345/1.1 |
| 6,508,554 | B2 | * | 1/2003  | Hatakeyama et al. ....... 353/31 |
| 6,636,275 | B1 |   | 10/2003 | Wilson |
| 6,803,561 | B2 | * | 10/2004 | Dunfield .................. 250/235 |
| 6,972,737 | B2 | * | 12/2005 | Furukawa et al. ........... 345/32 |
| 7,002,716 | B2 | * | 2/2006  | Wine et al. ............... 359/199 |
| 7,075,687 | B2 | * | 7/2006  | Lippert et al. ............. 359/201 |
| 2001/0038484 | A1 | * | 11/2001 | Harada .................... 359/204 |
| 2002/0024495 | A1 |   | 2/2002  | Lippert et al. .............. 345/98 |
| 2002/0024708 | A1 |   | 2/2002  | Lewis et al. .............. 359/197 |
| 2003/0011751 | A1 |   | 1/2003  | Sakata et al. |

FOREIGN PATENT DOCUMENTS

| WO | WO 03/005733 A1 | 1/2003 |
|---|---|---|
| WO | WO 03/098916 A2 | 11/2003 |
| WO | WO 2004/064410 A1 | 7/2004 |

* cited by examiner

*Primary Examiner*—Minsun Oh Harvey
*Assistant Examiner*—Phillip Nguyen
(74) *Attorney, Agent, or Firm*—Kirschstein, et al.

(57) ABSTRACT

A method and apparatus are provided to compensate for variations in the alignment of a plurality of lasers 102, 104, 106. A controller 142 varies the time at which the lasers 102, 104, 106 are energized so that the laser light emitted therefrom is reflected from a scanning mirror 118 at varying times so that each of the beams of light is reflected along a substantially common path and delivered to a substantially common point.

11 Claims, 3 Drawing Sheets

METHOD AND APPARATUS FOR ALIGNING A PLURALITY OF LASERS IN AN ELECTRONIC DISPLAY DEVICE

BACKGROUND OF THE INVENTION

1. Field of the Invention

This invention relates generally to electronic displays, and, more particularly, to a projection device employing a plurality of lasers.

2. Description of the Related Art

Some optical devices require two or more lasers to be projected to a common location. For example, in a color laser projection device, three lasers may be arranged to project on a single, common location. Each of the three lasers has a unique color component and its intensity may be controlled to vary the hue of the combined light appearing at the single, common location. A relatively complex color display may be produced by scanning the light from the three lasers in a two-dimensional array while controllably energizing each of the lasers.

Typically, the three lasers are arranged optically and/or mechanically to produce three collinear beams of light prior to being delivered to an optical/mechanical scanning system. In this manner, the three beams of light are scanned in the two-dimensional array with consistent and accurate alignment therebetween.

Such systems, however, have significant shortcomings, particularly regarding mass production and accuracy over distance. That is, extremely precise alignment of the lasers is required to insure that the beams of light remain collinear over even relatively short distances. For example, when transmitting the laser light over a distance of about ten inches an angular alignment of about 0.02 degrees between each of the laser beams is required to ensure that the laser beams arrive at the single, common point. This precise alignment is difficult to achieve in mass production, and, moreover, may be subject to variations that arise after manufacture is complete. For example, the mechanical/optical alignment may vary owing to "rough" handling of the device. Alternatively, variations in environmental temperature may likewise produce undesirable variations in the mechanical/optical alignment.

The present invention is directed to overcoming, or at least reducing, the effects of one or more of the problems set forth above.

SUMMARY OF THE INVENTION

In one aspect of the instant invention, a method is provided. The method comprises controllably aligning at least two lasers within a display device.

BRIEF DESCRIPTION OF THE DRAWINGS

The invention may be understood by reference to the following description taken in conjunction with the accompanying drawings, in which like reference numerals identify like elements, and in which.

Figure 1:
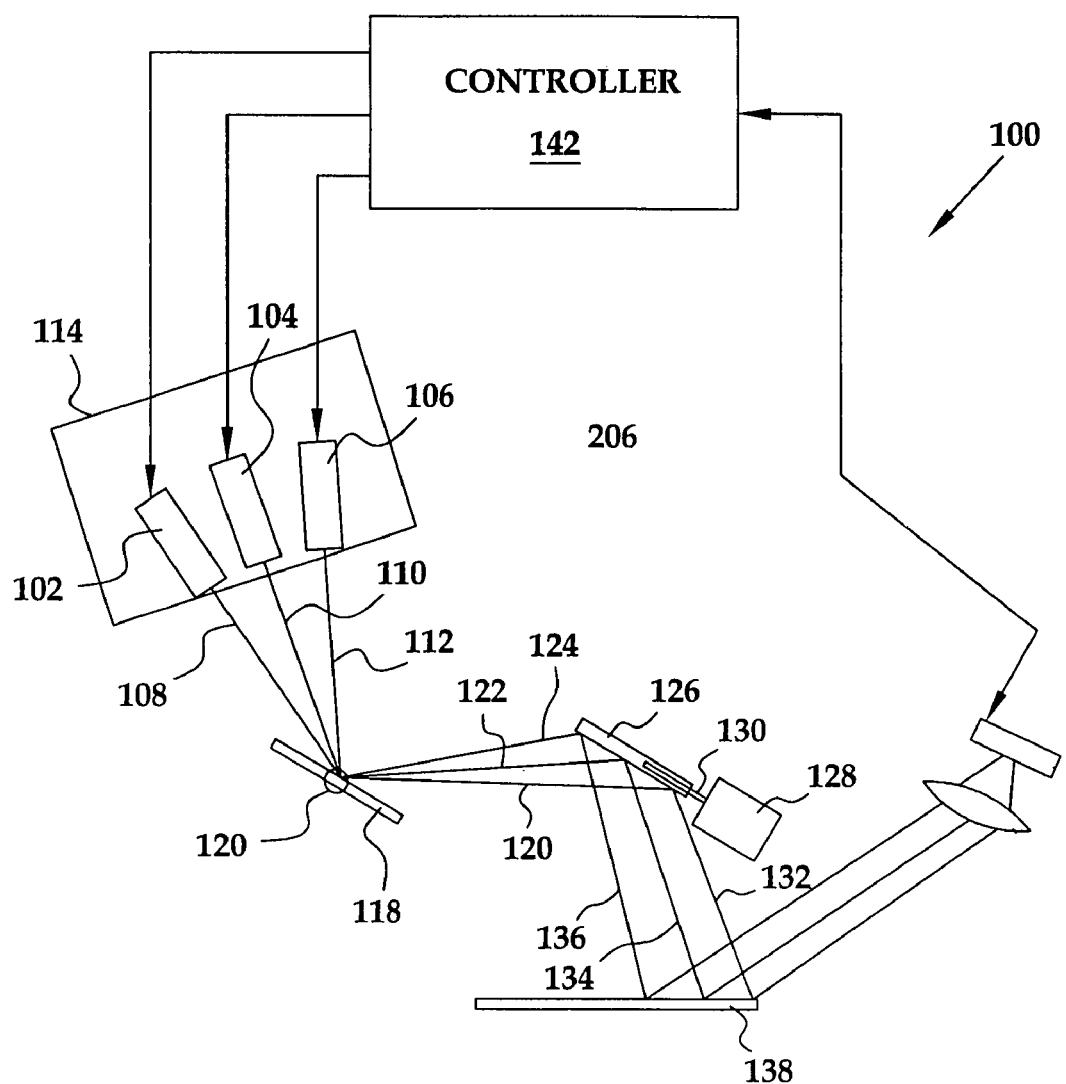
FIG. 1 is a stylistic block diagram of a top level view of one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a stylistic block diagram of a laser projection display (LPD) 100, in accordance with one embodiment of the present invention, is shown. In the illustrated embodiment, the LPD 100 includes three lasers 102, 104, 106, each capable of emitting a beam of light 108, 110, 112 consisting of a unique color, such as red, green or blue. Those skilled in the art will appreciate that the number of lasers and the color of light emitted therefrom may be varied without departing from the spirit and scope of the instant invention.

The lasers 102, 104, 106 are arranged in a common plane 114 with the beams of light 108, 110, 112 being angularly directed relatively to one another to fall on a substantially common location 116 on a first scanning device, such as a first scanning mirror 118, from where they are reflected as beams of light 120, 122, 124. In the illustrated embodiment, the first scanning mirror 118 oscillates on an axis 120 at a relatively high rate (e.g., 20-30 kHZ). Rotation or oscillation of the first scanning mirror 118 causes the beams of light 108, 110, 112 to be moved. That is, as the angular position of the first scanning mirror 118 alters, so to does the angle of reflection of the beams of light 120, 122, 124 from the first scanning mirror 118. Thus, as the mirror oscillates the reflected beams of light 120, 122, 124 are scanned to produce movement of the beams of light 120, 122, 124 along one component of the two-dimensional display.

The second component of the two-dimensional display is produced by a second scanning device, such as a mirror 126. In the illustrated embodiment, the second mirror 126 is coupled to a motor 128 at a pivot point 130 so as to produce rotational or oscillating movement about an axis that is substantially orthogonal to the axis of rotation of the first mirror 118. The beams of light 120, 122, 124 are reflected off of the second mirror 126 as beams of light 132, 134, 136 and directed to a viewing surface 138. The viewing surface may take on any of a variety of forms without departing from the spirit and scope of the instant invention.

Figure 2:
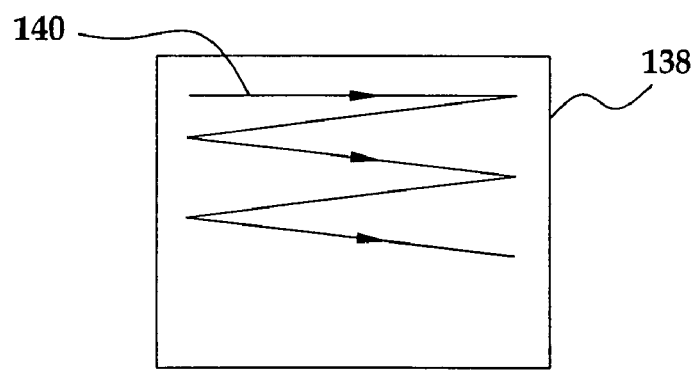
FIG. 2 is a stylistic view of a viewing surface shown in FIG. 1.

The second mirror oscillates or rotates at a relatively slow rate, as compared to the rate of the first mirror 118 (e.g., 60 hz). Thus, it will be appreciated that, as shown in FIG. 2, the beams of light 132, 134, 136 generally follow a path 140 on the display surface 138. Those skilled in the art will appreciate that the path 140 is similar in shape and concept to a raster scan commonly employed in cathode ray tube televisions and computer monitors.

While the instant invention is described herein in the context of an embodiment that employs separate first and second scanning mirrors 118, 126, those skilled in the art will appreciate that a similar path 140 may be produced by using a single mirror. The single mirror would be capable of being moved about two axis of rotation to provide the fast and slow oscillating movements along two orthogonal axes.

As is apparent from FIG. 1, owing to the angular positioning of the lasers 102, 104, 106, even though the lasers 102, 104, 106 have been arranged mechanically and optically to deliver the beams of light 108, 110, 112 within the same plane 114 and at the same point (on the rotational axis 120) on the mirror 118), each has a different angle of reflection, which causes the beams of light 120, 122, 124 to diverge. A controller 142 is provided to controllably energize the lasers 102, 104, 106 to effectively cause the beams of light 120, 122, 124 to be collinear, such that they may be reflected off of the second mirror 126 and delivered to the same point on the viewing surface 138 relatively independent of the distance of the viewing surface 138 from the second mirror 126.

Figure 3A:
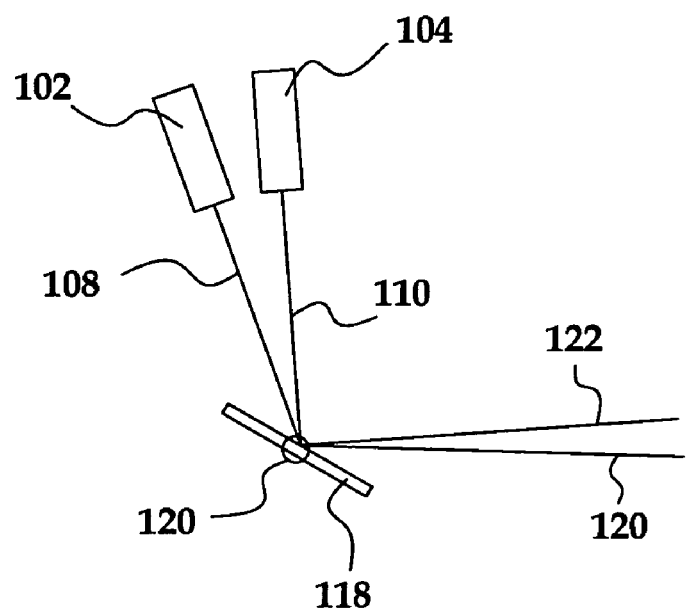
FIGS. 3A and 3B depict a top view of a scanning device at various times during its operation.
Figure 3B:
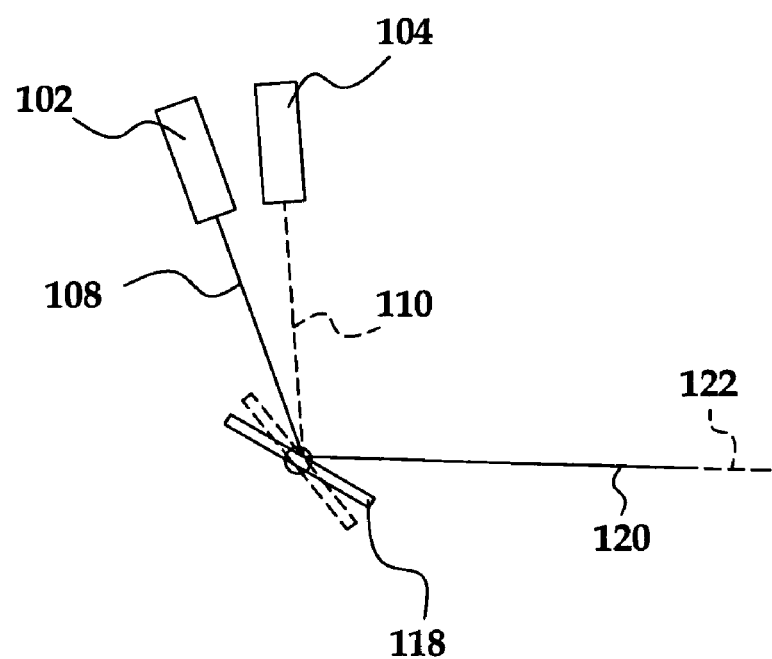

Turning now to FIGS. 3A and 3B, the operation of the controller 142 to cause the beams of light 120, 122, 124 to be collinear is discussed. To simplify the discussion, only two lasers 102, 104 are illustrated in FIG. 3, but those skilled in the art will appreciate that the concepts discussed herein may be extended to three or more lasers without departing from the spirit and scope of the instant invention. As shown in FIG. 3A, if the lasers 102, 104 are energized simultaneously, the reflected beams of light 120, 122 diverge. However, as shown in FIG. 3B, if the lasers 102, 104 are energized at slightly different times, then the beams of light 120, 122 can be made to follow a single, common path (i.e., the beams of light 120, 122 are collinear). For example, if the laser 102 is energized at a first time t1, then the mirror 118 will be at a first position, as represented by the solid lines, and the beam of light 108 will reflect off of the mirror 118 as the beam of light 120. Subsequently, if the laser 104 is energized at a second time t2, then the mirror 118 will be at a second position, as represented by the dashed lines, and the beam of light 110 will reflect off of the mirror 118 as the beam of light 122. By precisely controlling the time t2, the mirror 118 will be in a position to accurately reflect the beam of light 122 along substantially the same path as the beam of light 120.

Thus, through the operation of the controller 142, the beams of light 120, 122 are substantially collinear, but are slightly displaced in time. That is, the beams of light 120, 122 will now both be projected onto substantially the same point on the display surface 138, but at slightly different times. However, owing to the persistence of the human eye, the variation in timing is not detectable. That is, in the case of the three laser system described in FIG. 1, each of the lasers 102, 104, 106 will controllably deliver laser light of a unique color and intensity to substantially the same point on the viewing surface 138 within a relatively short window of time. The human eye will not detect the three separate colors but rather will perceive a blending of the three light beams such that a consistent and desired hue appears at that point on the viewing surface. Those skilled in the art will appreciate that this process may be repeated numerous times along the path 140 to recreate a picture on the viewing surface 138.

Figure 4:
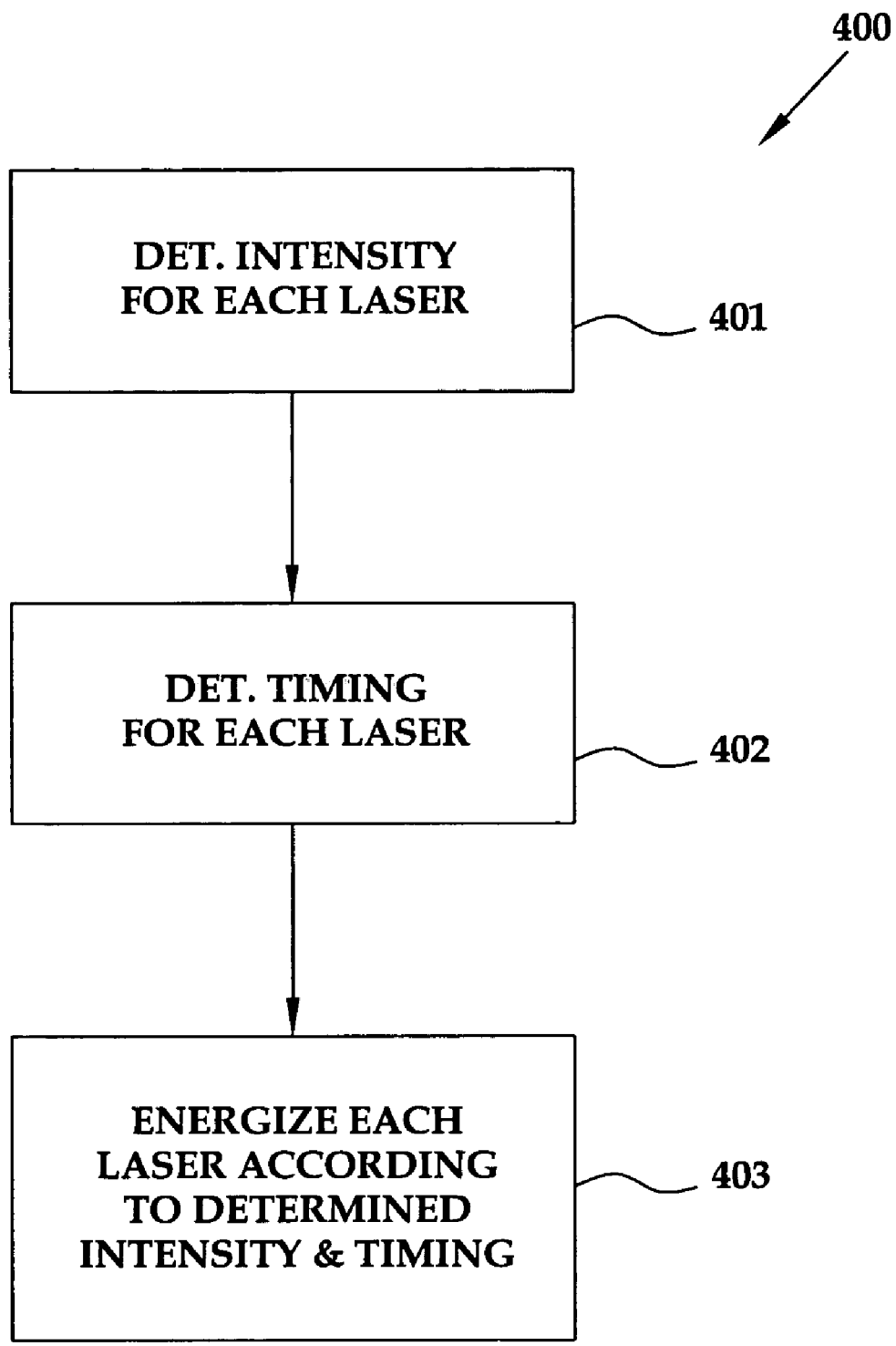
FIG. 4 depicts one embodiment of a flow chart of a control program that may executed by a controller shown in FIG. 1.

Turning now to FIG. 4, one embodiment of a control routine 400 that may be used in the controller 142 is illustrated. The routine begins at block 401 with the controller 142 determining the intensity for each of the lasers. That is, in order for a picture to be properly displayed, the controller 142 is capable of determining the hue of the picture at that small portion of the picture that is about to be projected onto the viewing surface. To reproduce the proper hue, the controller 142 determines the intensity for each of the lasers. This determination may be accomplished in any of a variety of conventional manners, such as via a look-up table, via a mathematical algorithm or the like.

In block 402, the controller 142 determines the time at which each of the lasers is to be energized. The determination of the timing may be accomplished in any of a variety of conventional manners, such as via a look-up table, via a mathematical algorithm or the like. This technique can be used during a calibration after manufacture. Ordinarily, this timing may be relatively fixed. That is, the timing may be established at the end of the manufacturing process by a factory technician, and thereafter, the controller may simply use these factory determined settings.

It may be useful, however, to allow a technician or even a consumer to periodically make adjustments to the timing to account for mechanical changes in the system 100 that arise from environmental conditions, such as temperature or harsh treatment. Since the timing variations may be accomplished by storing the timing requirements in non-volatile memory, a routine may be established to allow these settings to be altered as needed. That is a software routine may be included to project preselected tuning patterns (such as a cross pattern for each color laser) on the viewing surface. A service technician or consumer may then indicate to the controller (by depressing a preselected sequence of buttons) that the tuning patterns need to be adjusted to cause them to overlap properly. The controller 142 may then use the technician or consumer supplied information to alter the timing of the lasers.

Finally, in block 403, the controller 142 uses the determined timing and intensity for each of the lasers and controllably energizes the lasers to produce the desired hue at the present location on the viewing surface. The control routine 400 is continuously repeated for numerous points along the path 140 to effectively reproduce a picture on the viewing surface.

It should be appreciated that the controller 142 may compensate for the "known" angular positions of the lasers 102, 104, 106, but also for "unknown" variations in the positions of the lasers 102, 104, 106. That is, as illustrated in FIG. 1, the lasers 102, 104, 106 are arranged angularly disposed relative to one another, and the angular relationship is generally known. However, during the manufacturing process, minor variations from the "known" angular positons may occur. Nevertheless, both the known and unknown variations may be compensated for using the above described method and apparatus.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by the control units cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. Consequently, the method, system and portions thereof and of the described method and system may be implemented in different locations, such as the wireless unit, the base station, a base station controller and/or mobile switching center. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. It is therefore evident that the particular embodiments disclosed above may be altered or modified and all such variations are considered within the scope and spirit of the invention. Accordingly, the protection sought herein is as set forth in the claims below.

We claim:

1. A laser beam alignment arrangement for projecting an image on a projection surface, the arrangement comprising:
    a) a plurality of energizable lasers for respectively generating laser beams directed along different directions that are inclined relative to one another;
    b) a scan mirror oscillatable about an axis, and operative for reflecting the laser beams incident on the scan mirror as reflected laser beams; and
    c) a controller operatively connected to the lasers for energizing the lasers at different times during oscillation of the scan mirror to cause the reflected laser beams to travel collinearly along a common path and illuminate a common point on the projection surface, the different times being imperceptible to a human eye.

2. The arrangement of claim 1, wherein the lasers have different wavelengths, and wherein the laser beams have different colors.

3. The arrangement of claim 1, wherein the different directions of the laser beams intersect one another at the axis of the scan mirror.

4. The arrangement of claim 1, wherein the laser beams illuminate a common beam spot on the scan mirror, and wherein the scan mirror sweeps the collinearly traveling reflected laser beams as a scan line extending along one dimension of the image, and further comprising another scan mirror for sweeping the scan line along another dimension orthogonal to said one dimension to create a raster pattern of scan lines.

5. The arrangement of claim 1, wherein the controller energizes one of the lasers at one of the times when the scan mirror is in one angular position relative to the axis, and wherein the controller energizes another of the lasers at another of the times when the scan mirror is in another different angular position relative to the axis.

6. A laser beam alignment method of projecting an image on a projection surface, the method comprising the steps of:
    a) directing a plurality of laser beams along different directions that are inclined relative to one another;
    b) oscillating about an axis a scan mirror for reflecting the laser beams incident on the scan mirror as reflected laser beams;
    c) generating the laser beams at different times during oscillation of the scan mirror to cause the reflected laser beams to travel collinearly along a common path and illuminate a common point on the projection surface, the different times being imperceptible to a human eye.

7. The method of claim 6, and the step of configuring the laser beams with different colors.

8. The method of claim 6, wherein the step of generating the laser beams is performed by energizing different lasers at said different times.

9. The method of claim 6, and the step of arranging the different directions of the laser beams to intersect one another at the axis of the scan mirror.

10. The method of claim 6, wherein the directing step is performed by arranging the laser beams to illuminate a common beam spot on the scan mirror, and wherein the oscillating step is performed by sweeping the collinearly traveling reflected laser beams as a scan line extending along one dimension of the image, and by sweeping the scan line along another dimension orthogonal to said one dimension to create a raster pattern of scan lines.

11. The method of claim 6, wherein the generating step is performed by generating one of the laser beams at one of the times when the scan mirror is in one angular position relative to the axis, and by generating another of the laser beams at another of the times when the scan mirror is in another different angular position relative to the axis.

* * * * *